(12) United States Patent
Nishikawa et al.

(10) Patent No.: US 7,721,309 B2
(45) Date of Patent: May 18, 2010

(54) SYSTEM AND METHOD FOR PROVIDING CHANNEL SELECTION IN AN ELECTRONIC PROGRAMMING GUIDE

(75) Inventors: Yuko S. Nishikawa, La Jolla, CA (US); Aaron John Dew, San Diego, CA (US); Ronaldo Diaz, San Diego, CA (US); Jenny Su Chow, San Diego, CA (US)

(73) Assignees: Sony Corporation, Tokyo (JP); Sony Electronics Inc., Park Ridge, NJ (US)

( * ) Notice: Subject to any disclaimer, the term of this patent is extended or adjusted under 35 U.S.C. 154(b) by 1304 days.

(21) Appl. No.: 09/745,606

(22) Filed: Dec. 20, 2000

(65) Prior Publication Data

US 2002/0078457 A1 Jun. 20, 2002

(51) Int. Cl.
*H04N 5/445* (2006.01)
(52) U.S. Cl. .......................... 725/44; 725/134; 709/219
(58) Field of Classification Search ............. 725/37–61, 725/132, 134, 140, 142; 709/217–223
See application file for complete search history.

(56) References Cited

U.S. PATENT DOCUMENTS

| | | | | |
|---|---|---|---|---|
| 5,329,590 | A * | 7/1994 | Pond ........................... | 380/242 |
| 5,453,758 | A | 9/1995 | Sato | |
| 5,477,262 | A * | 12/1995 | Banker et al. .................. | 725/38 |
| 5,535,121 | A * | 7/1996 | Roche et al. .................... | 704/9 |
| 5,592,551 | A * | 1/1997 | Lett et al. .................... | 380/211 |
| 5,596,373 | A * | 1/1997 | White et al. ................. | 348/569 |
| 5,737,029 | A * | 4/1998 | Ohkura et al. ................. | 725/56 |
| 5,798,785 | A * | 8/1998 | Hendricks et al. ............. | 725/46 |
| 5,805,235 | A * | 9/1998 | Bedard ......................... | 725/38 |
| 5,808,694 | A * | 9/1998 | Usui et al. .................... | 725/49 |
| 5,917,481 | A * | 6/1999 | Rzeszewski et al. ........ | 345/721 |
| 5,978,043 | A * | 11/1999 | Blonstein et al. ............ | 348/569 |
| 6,002,394 | A * | 12/1999 | Schein et al. .................. | 725/39 |
| 6,006,241 | A * | 12/1999 | Purnaveja et al. ........... | 715/205 |
| 6,078,348 | A | 6/2000 | Klosterman et al. | |
| 6,141,003 | A * | 10/2000 | Chor et al. ................... | 715/719 |
| 6,177,931 | B1 * | 1/2001 | Alexander et al. ............ | 725/52 |
| 6,249,773 | B1 * | 6/2001 | Allard et al. .................. | 705/26 |
| 6,268,849 | B1 * | 7/2001 | Boyer et al. .................. | 725/40 |
| 6,317,885 | B1 * | 11/2001 | Fries .......................... | 725/109 |
| 6,336,053 | B1 * | 1/2002 | Beatty ........................ | 700/108 |
| 6,463,586 | B1 * | 10/2002 | Jerding ........................ | 725/37 |
| 6,496,927 | B1 * | 12/2002 | McGrane et al. ............... | 713/1 |
| 6,526,577 | B1 * | 2/2003 | Knudson et al. .............. | 725/40 |
| 6,545,722 | B1 * | 4/2003 | Schultheiss et al. ......... | 348/552 |
| 6,563,515 | B1 * | 5/2003 | Reynolds et al. ............ | 345/721 |
| 6,571,390 | B1 * | 5/2003 | Dunn et al. ................... | 725/52 |
| 6,615,248 | B1 * | 9/2003 | Smith ......................... | 709/217 |

(Continued)

*Primary Examiner*—Annan Q Shang
(74) *Attorney, Agent, or Firm*—Fitch, Even, Tabin & Flannery (57) ABSTRACT

The present invention relates to an entertainment system and method for selectively storing broadcast channels by the entertainment system. To store a broadcast channel, the system first receives programming data associated with the channel. A show associated with the channel is displayed and a menu associated with the storing of the channel in memory may also be displayed. The viewer may then select to add to or remove from memory the programming data associated with the currently tuned channel via a one-step process, and the programming data is subsequently loaded into the memory.

18 Claims, 8 Drawing Sheets

U.S. PATENT DOCUMENTS

| | | | |
|---|---|---|---|
| 6,631,523 B1 * | 10/2003 | Matthews et al. | 725/53 |
| 6,661,468 B2 * | 12/2003 | Alten et al. | 348/569 |
| 6,732,369 B1 * | 5/2004 | Schein et al. | 725/39 |
| 6,754,905 B2 * | 6/2004 | Gordon et al. | 725/38 |
| 6,772,433 B1 * | 8/2004 | LaJoie et al. | 725/52 |
| 6,874,152 B2 * | 3/2005 | Vermeire et al. | 719/330 |
| 6,978,473 B1 * | 12/2005 | Nsonwu et al. | 725/52 |
| 7,398,541 B2 * | 7/2008 | Bennington et al. | 725/40 |
| 2001/0044855 A1 * | 11/2001 | Vermeire et al. | 709/310 |
| 2003/0009758 A1 * | 1/2003 | Townsend et al. | 725/39 |
| 2004/0133910 A1 * | 7/2004 | Gordon et al. | 725/37 |
| 2005/0278741 A1 * | 12/2005 | Robarts et al. | 725/46 |

* cited by examiner

SYSTEM AND METHOD FOR PROVIDING CHANNEL SELECTION IN AN ELECTRONIC PROGRAMMING GUIDE

BACKGROUND OF THE INVENTION

1. Field of the Invention

The present invention relates generally to the presentation of channel, program, and broadcast information for a multiple channel television broadcast system. More particularly, the present invention relates to a system and method for identifying, selecting and storing channel information in a multiple channel television broadcast system.

2. Description of Art Related to the Invention

In recent years, there has been a increasing demand for entertainment systems working in conjunction with various types of broadcasting systems, including systems that broadcast on the airwaves, through cable and via satellite. Along with this demand is a corresponding increase in the number of stations accessible. To select a program to view, many viewers simply "channel surf" until they find a channel with a desirable program. Channel surfing refers to the process of sequentially viewing each channel. Although some viewers find channel surfing among hundreds of stations enjoyable, most viewers prefer a more direct method for selecting a program to view.

One current approach involves the use of a television channel selection guide which displays a listing of the channels typically in numerical or alphabetical order and the titles of the programs broadcasted or to be broadcasted on the channels. The viewer or user of the system may then select the channel by entering in the channel number or selecting a program. The system responds by removing the guide displayed and tuning to the station selected and displaying the broadcast signals of the station. Another approach allows the viewer or user to create a "favorite" list of channels that requires the user to select a channel number or an icon, and then add the channel to a "favorite" list. These techniques are each accomplished through a multi-step process.

In the current generation of broadcasting system technology, a viewer is provided with many options regarding programs that are available for broadcast. These options include, but are not limited to, channel surfing among program descriptions while watching a particular program on one channel, on-demand selection of pay-per-view broadcasts, selection of a broadcast for automatic recording, and programming a broadcast system to tune to a preselected station at a designated time. These options are typically multi-step processes, that are accessed through a graphical user interface. As the number of viewer options increases, so does the need for a simple, user-friendly system interface.

SUMMARY OF THE INVENTION

The present invention relates to an entertainment system and method for selectively storing broadcast channels by the entertainment system. To store a broadcast channel, the system first receives programming data associated with the channel. A show associated with the channel is displayed and a menu associated with the storing of the channel in memory may also be displayed. The viewer may then select to add to or remove from memory the programming data associated with the currently tuned channel via a one-step process, and the programming data is subsequently loaded into the memory.

BRIEF DESCRIPTION OF THE DRAWINGS

The features and advantages of the present invention will become apparent from the following detailed description in combination with the figures listed below.

DESCRIPTION OF THE PREFERRED EMBODIMENT

In one embodiment, the present invention relates to a system and method for identifying, selecting and storing channel information in a multiple channel television broadcast system. One aspect of the invention allows the creation of a favorite channel list by adding or removing the currently tuned station to or from the favorite channel list. In one embodiment, the user may add or remove the station he is currently viewing to or from a favorite channel list through a single-step process. Existing implementations each require a complicated, multi-step process to add or remove stations.

Herein, various terms are used to describe certain elements or characteristics of the present invention. For example, a "communication link" is broadly defined as any communication path between a source and a destination. The communication line may include one or more information-carrying lines (electrical wire, fiber optics, cable, etc.) or wireless communications through established techniques such as infrared (IR) and radio frequency (RF) signaling. A "signal" is construed as information transmitted in a parallel or serial manner. Stored within the system, "programming data" includes information of channels chosen by the user to be entered into memory. While certain illustrative embodiments are described in order to convey the spirit and scope of the present invention, such embodiments should not be construed as a limitation on the scope of the present invention.

Figure 1A:
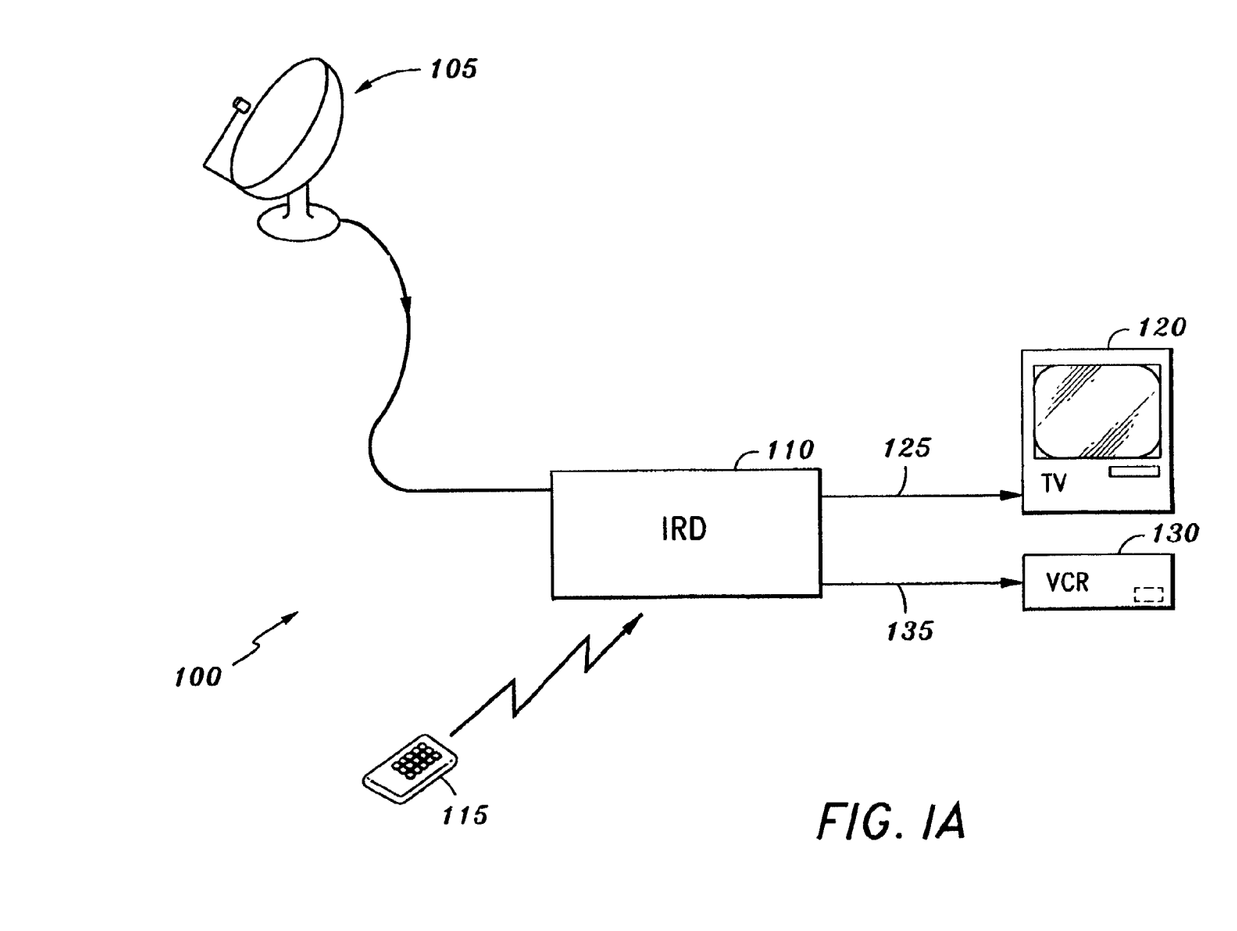
FIG. 1A is an illustrative embodiment of an entertainment system utilizing the present invention.

Referring to FIG. 1, one embodiment of an entertainment system utilizing the present invention is shown. The entertainment system 100 comprises an antenna 105, a broadcast receiver 110 such as an integrated receiver decoder (IRD) for example, and at least one analog-input peripheral device (e.g., a display monitor such as television receiver "TV" 120 and/or an analog recording device 130 such as a video cassette recorder "VCR"). The broadcast receiver, in general, receives a broadcast signal (a digital bit stream for example) and performs operations on the broadcast signal to produce digital and/or analog information. Although the IRD is implemented as the broadcast receiver in this embodiment, other types of broadcast receivers may be used such as a cable box for a Cable Broadcasting System, an Internet terminal, a digital satellite system (DSS) computer and the like.

Antenna 105 receives the digital bit stream from an orbiting satellite (not shown) and routes the bit stream to IRD 110. The bit stream is formatted in accordance with any video compression function and is usually encrypted under either a symmetric key cryptographic function or a public-key cryptographic function. Typically, the bit stream includes sensory data (e.g., video and/or audio, or communication data) and control information for a number of shows. The control information for each show includes programming data having the following content: date of broadcast, broadcast channel number, show start-time, show end-time, and also show title.

IRD 110 is responsible for decoding the bit stream, for storing programming data in timer memory accessible by software executed by IRD 110, and for processing the decoded bit stream to produce one or more output signals having appropriate formats. As shown, an output signal is placed in an analog format and sent via communication line 125 to TV 120 for viewing, and/or via communication line 135 to analog recording device 130 for recording. The analog format may be in accordance with a video format established by National Television Systems Committee (NTSC), or perhaps other video formats, including but is not limited or restricted to Phase Alternating Line (PAL), Sequential Couleur Avec Memoire (SECAM) and other recognized formats.

Figure 1B:
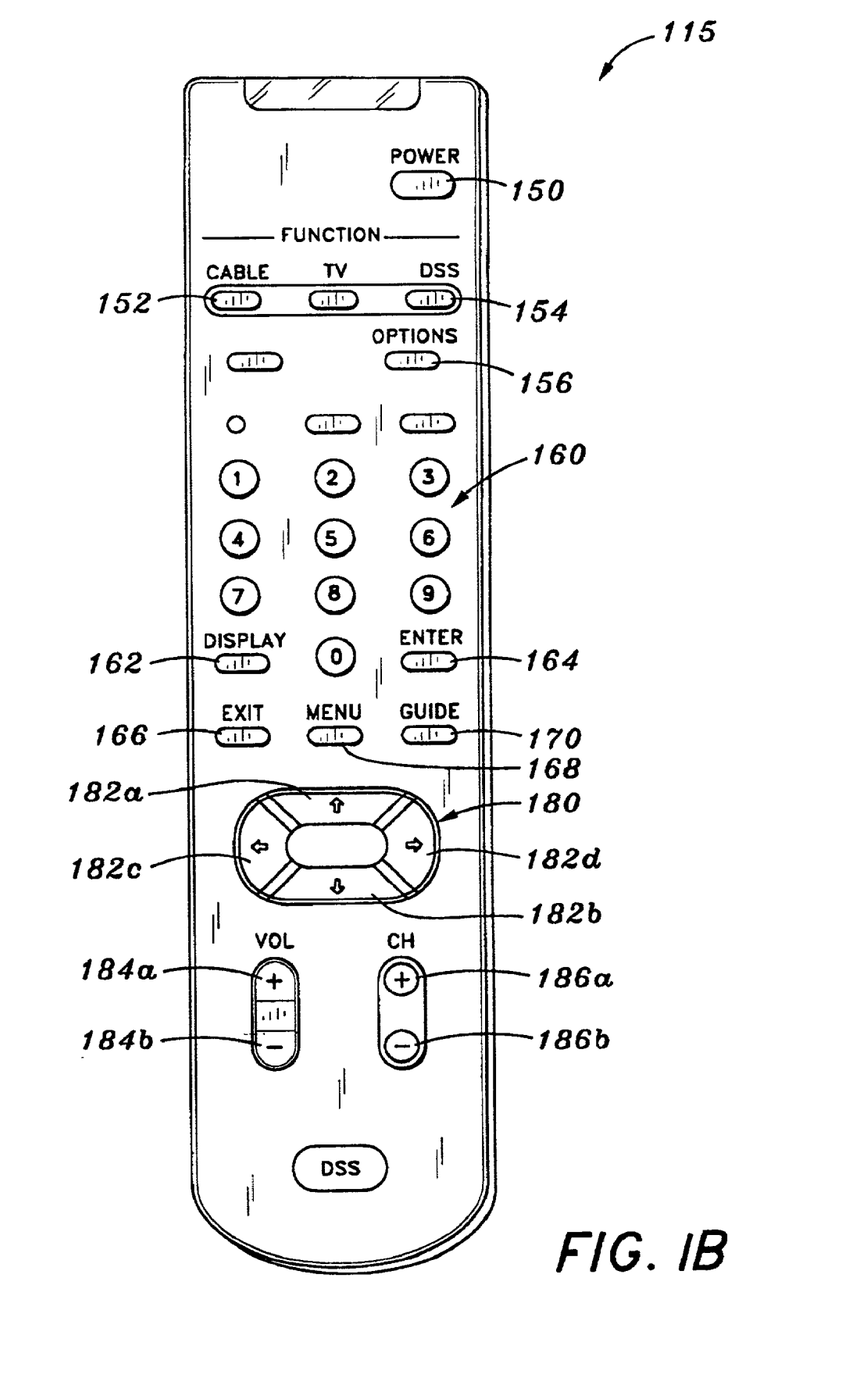
FIG. 1B is an illustrative embodiment of the remote controller 115 of FIG. 1A.

Additionally, IRD 110 is responsible for responding to a plurality of commands from a remote control 115. Remote control 115 may include any type of remote control, including one described in U.S. Pat. No. 5,453,758 assigned to Sony Corporation of Tokyo, Japan. FIG. 1B is an illustrative embodiment of the remote control 115 of FIG. 1A. The remote control 115 comprises a power key 150 for activating the IRD 110 via a communication link, a cable key 152 which facilitates selection of cable channels, a DSS key 154 which facilitates selection of satellite-based channels, an OPTIONS key 156 for facilitating selection of desired channels; a numerical keypad 160, a DISPLAY key, an ENTER key 164, an EXIT key 166, a MENU key 168, and a GUIDE key 170. The remote control 115 further comprises an ABXY button grid 180 (which includes scroll buttons 182a-d), a pair of volume keys 184a, 184b, and a pair of channel selection keys 186a, 186b. In one embodiment, the ABXY button grid 180 is a video game control used by many commercially available video systems such as those made and manufactured by Nintendo of Japan.

Figure 2A:
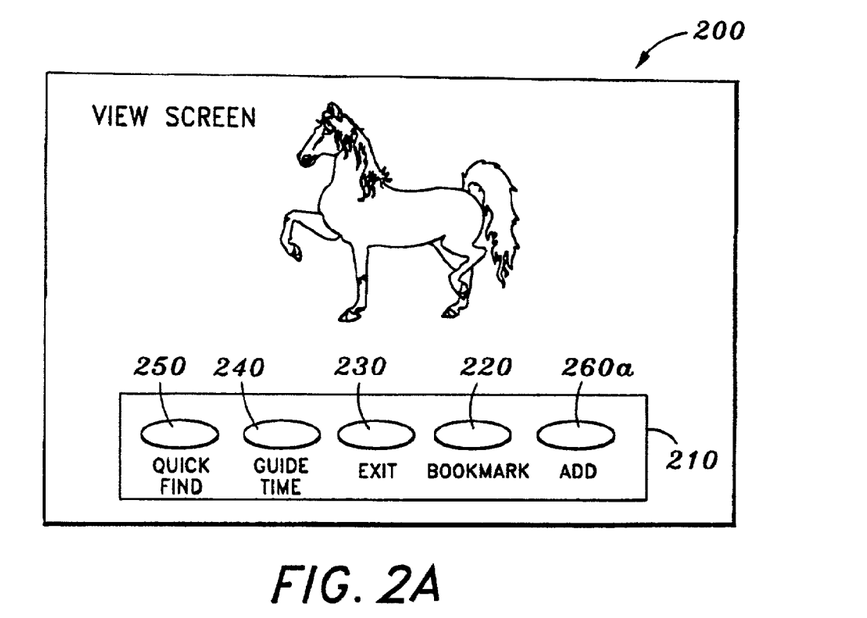
FIG. 2A illustrates one embodiment of a view screen with an options menu 210 provided in accordance with the principles of the invention.

Examples of commands from remote control 115 include a first command by pressing the OPTIONS key 156, causing IRD 110 to produce an output signal displaying at least an options menu 210 on TV 120, as shown in FIG. 2A. The options menu 210 may be superimposed over a view screen 200 displaying a show from a selected channel. In one embodiment, the options menu 210 comprises a number of icons, each of which can be selected to perform a function associated with one or more shows or channels. In one embodiment, the options menu 210 includes an ADD icon 260a that the user may select to add the current channel to a list of selected or preferred channels.

Figure 3A:
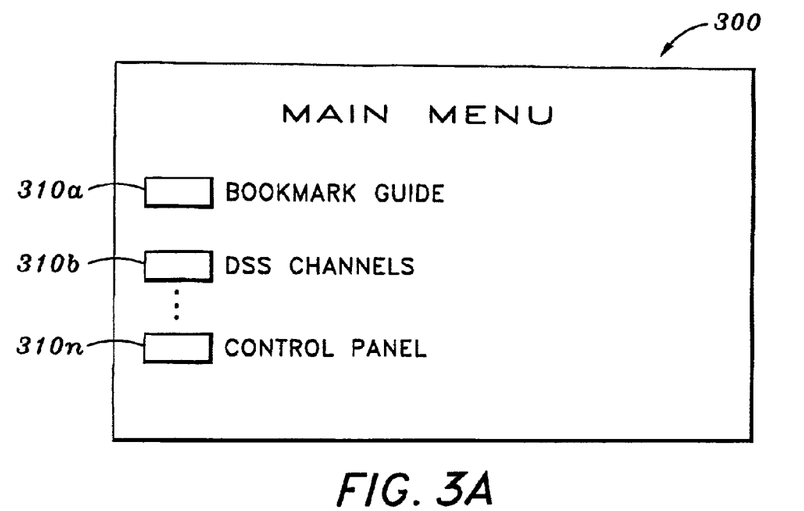
FIG. 3A illustrates one embodiment of a main menu displaying a list of menus.
Figure 3B:
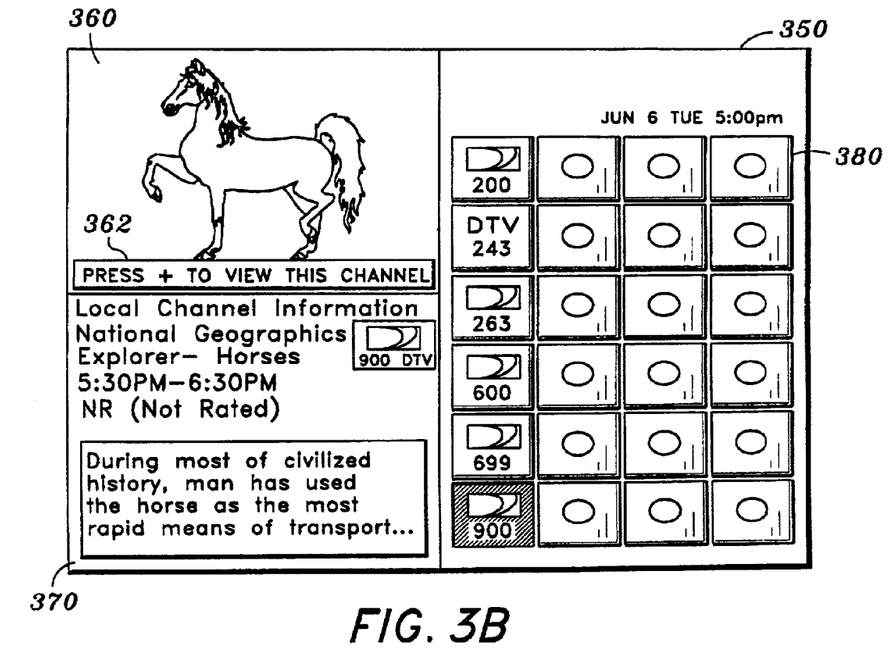
FIG. 3B illustrates one embodiment of an electronic bookmark guide with a graphical portion, a description information parcel portion and a custom channel mark guide portion as provided in accordance with the principles of the invention.

To view the list, the viewer may select the BOOKMARK icon 220. Upon selection of the BOOKMARK icon 220, an electronic BOOKMARK guide 350 is displayed (see FIG. 3B). In one embodiment, the BOOKMARK guide 350 includes a graphical portion 360, a textual portion 370 and a list or index of the selected or stored channels 380. In a further embodiment, the list or index of selected channels 380 is displayed in the form of table, as shown in FIG. 3B.

Figure 2B:
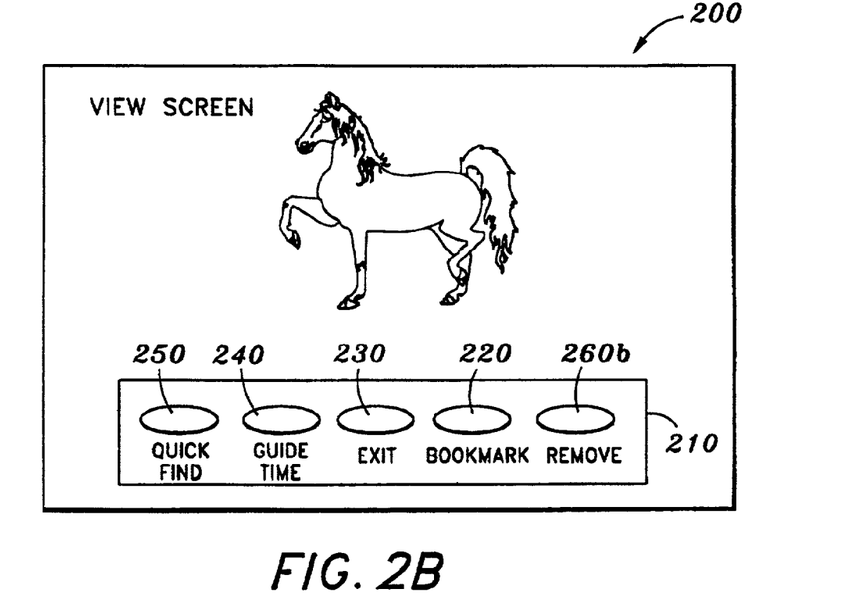
FIG. 2B illustrates a second embodiment of the view screen with the options menu 210.

To exit from the options menu 210, the viewer may select the EXIT icon 230. Additional icons, such as icons 240 and 250 may be included in the options menu 210 for selection of other functions. If the current channel has been previously selected, the ADD icon 210 will be replaced by a REMOVE icon 260b, as shown in FIG. 2B. In this case, the viewer is reminded that the channel has already been added to the list. In addition, the viewer may also remove the previously selected channel from the list.

The viewer may also issue a second command via remote controller 115 by pressing the MENU key 168, causing IRD 110 to produce an output signal displaying a main menu on TV 120. FIG. 3A illustrates one embodiment of a main menu 300 that is displayed upon depressing of the MENU key 168. The main menu 300 displays a list of menus or selections, which in one embodiment includes a bookmark guide icon 310a, a DSS channels icon 310b, . . . , and a control panel 310n. It is understood that the main menu 300 may include a fewer number or a greater number of menus or selections as discussed above, and the list of selections may be determined by the developer or manufacturer. The selections shown are provided only for discussion purposes. The viewer may scroll through the list 310a-n in the main menu 300 by using the ABXY scroll keys 182a-d. Alternatively, the viewer may scroll through the list 310a-n using the channel buttons 186a, 186b. Upon selection of the BOOKMARK guide icon 310a, the electronic BOOKMARK guide 350 is displayed on the view screen, as shown in FIG. 3B.

The electronic BOOKMARK guide 350 comprises a graphical portion 360, a textual portion 370 and a stored channel index 380. The viewer may navigate through the index 380 by using the ABXY buttons 182a-d on the remote controller 115. While navigating or scrolling through the index 380, the graphical portion 360 displays a picture from a show associated with a highlighted or currently displayed channel in the index 380, such as highlighted channel 900 in FIG. 3B. In one embodiment, a channel selection guide 362 is superimposed over the picture in the graphical portion 360. The textual portion 370 provides a description of the currently displayed channel. To select viewing of the currently displayed channel, the viewer may select the channel key+186a on the remote control 115. Alternatively, the viewer may select any other key, such as the ENTER button 164 on the remote control 115, as instructed by the information showed in the channel selection guide 362.

Figure 4:
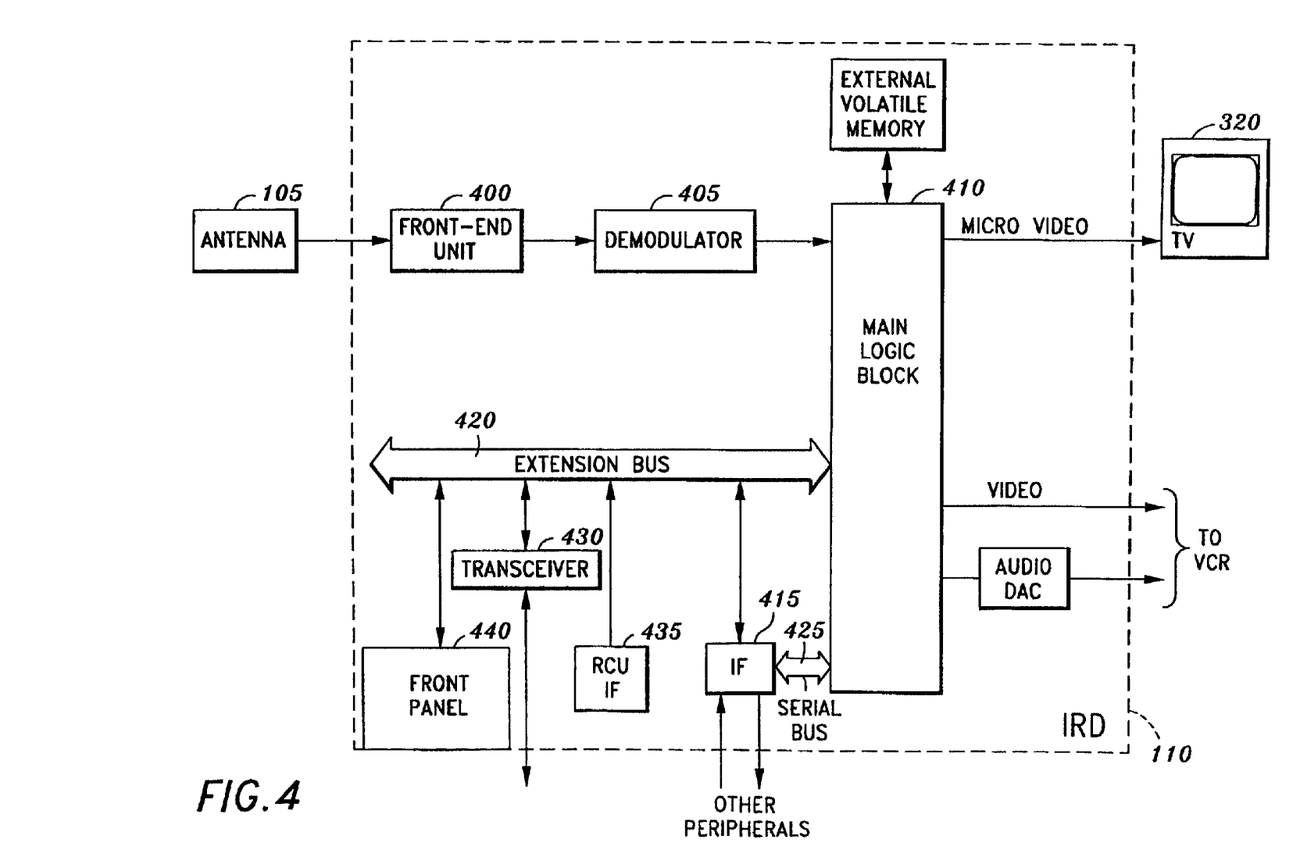
FIG. 4 illustrates a detailed block diagram of one embodiment of the IRD 110 of FIG. 1A.

Referring now to FIG. 4, one embodiment of an integrated receiver decoder (IRD) 110 is shown. The antenna 105 transfers the bit stream to a front-end unit 400 of the IRD 110. Although not shown, the front-end unit 400 includes (i) amplification circuitry used to amplify any relatively weak signals received at antenna 105, and (ii) a tuner which allows a user to receive a desired broadcast channel.

For the case where the user wishes to view a show provided by the digital satellite system service provider, the bit stream associated with the desired broadcast channel is routed from front-end unit 400 to a demodulator 405. In demodulator 405, the bit stream is initially processed before transferring to a main logic block 410 for further processing. Such initial processing may include exposing the bit stream to QPSK-demodulation, viterbi-decoding, de-interleaving and Reed-Solomon decoding.

In certain situations, IRD 110 is connected to other peripheral devices though an interface (IF) 415. In this embodiment, IF 415 may include a link layer integrated circuit (IC) and a physical layer IC (not shown) and complies with the IEEE standards document 1394 entitled "Standard for High Performance Serial Bus" (hereinafter referred to as "IEEE 1394"). This enables IRD 110 to connect to digital-input peripheral devices such as digital VCRs, digital video disk players, digital laser disk players and the like. These digital-input peripheral devices communicate with a central processing unit (CPU) within main logic block 410 (see FIG. 5) through IF 415 and either extension bus 420 or alternatively an IEEE 1394 serial bus 425.

Referring still to FIG. 4, extension bus 420 supports input/output (I/O) communications by providing a communication path between electronic circuitry of the main logic block 410 and a number I/O related devices. These I/O related devices include a transceiver device 430 (e.g., a modem), a remote command unit interface (RCU-IF) 435, and a front panel 440. In one embodiment, the front panel 440 includes buttons or switches for receiving user input or commands. The buttons or switches may correspond to those on the remote controller 115 and the buttons or switches on the front panel 440 may be used to issue commands to the IRD 110 instead of the remote controller 115. RCU-IF 435 receives commands from the remote controller 115, and decodes the commands to produce interrupt request signals (IRQs) corresponding to these commands. Each IRQ is transferred to the CPU within the main logic block 410. The front panel 440 includes buttons or switches to provide user functionality and access to the system as described herein. Control of such user functionality and access may also be provided through use of the keys in remote control 115 as described earlier.

Figure 5:
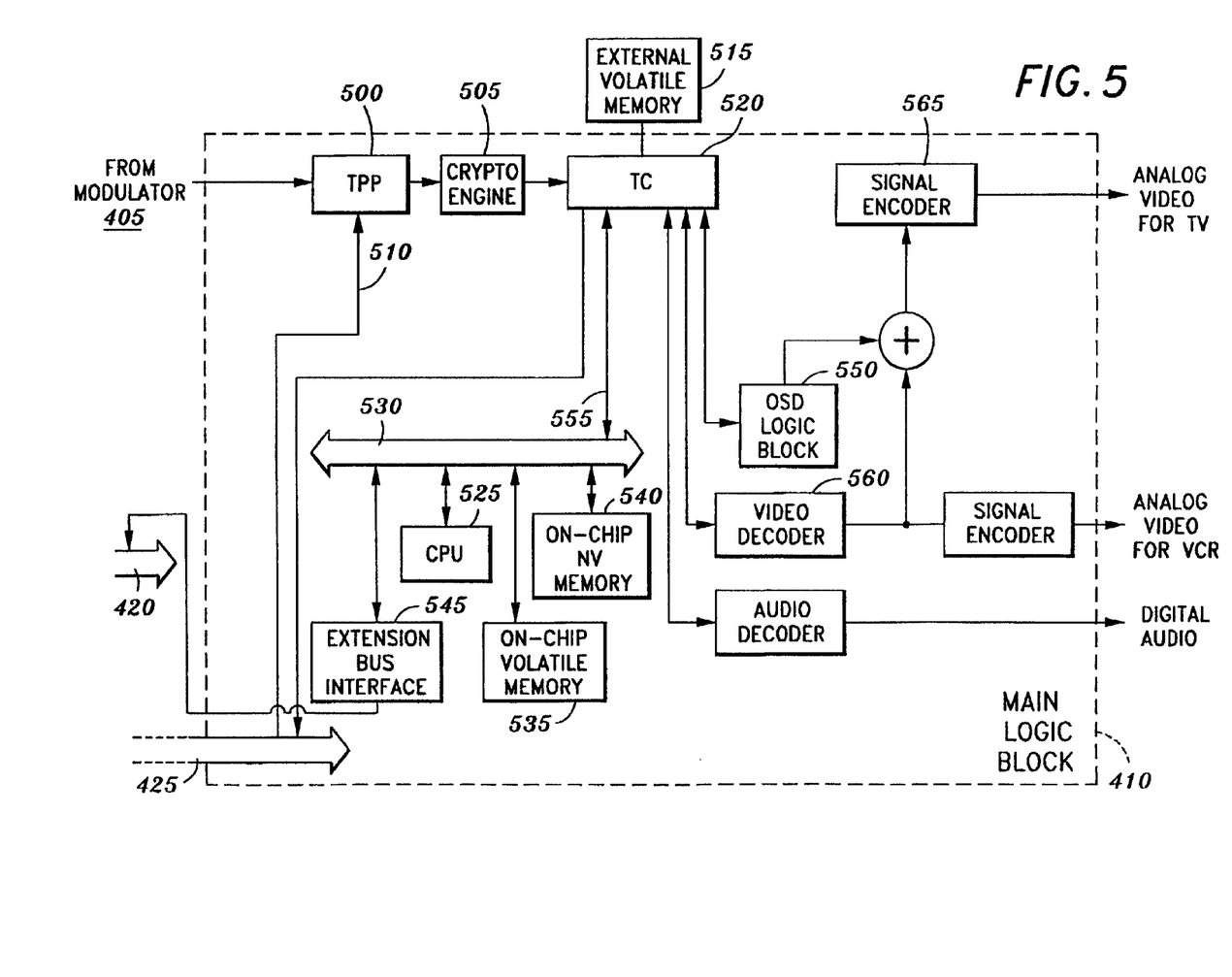
FIG. 5 illustrates a detailed block diagram of one embodiment of the Main Logic Block 410 of FIG. 4.

Referring now to FIG. 5, electronic circuitry of the main logic block 410 is shown. The Transport Packet Parser (TPP) 500 receives the decoded bit stream and parses the bit stream. This parsed bit stream is decrypted by a cryptographic engine 505 which may operate in accordance with a cryptographic function, for example Data Encryption Standard (DES). However, if the bit stream is received from IF 415 via communication line 510, cryptographic engine 505 will be precluded from decrypting the bit stream since it is already in a decrypted form. Thereafter, the decrypted bit stream, including the programming data, is stored in an external volatile memory 515 (e.g., random access memory "RAM") under the control of traffic controller (TC) 520.

CPU 525 controls the operations of the IRD by communicating with a plurality of elements through an internal high-speed bus 530. These elements include an optional volatile memory 535, at least one non-volatile (NV) memory element 540 (e.g., read only memory "ROM", erasable programmable read only memory "EPROM", flash memory, etc.) to contain software programs, extension bus interface 545, and traffic controller 520. NV memory element 540, in lieu of external NV memory 445 of FIG. 4, may be used to store software needed by CPU 525 (e.g., interrupt software) or perhaps stored channel data. Extension bus interface 545 allows CPU 525 to communicate with the devices coupled to extension bus 420.

Referring to FIGS. 4-5, the operations performed by IRD 110 to support selective storing of desired channels are described. Upon receiving the first command from the remote control (e.g., user depressing "OPTIONS" button of remote control), RCU-IF 435 transfers a first interrupt request signal (IRQ1), corresponding to the first command, directly to CPU 525 or indirectly through a queuing mechanism (not shown). In response to detecting IRQ1, CPU 525 executes interrupt software contained in external NV memory element 445 (or NV memory element 540) and services IRQ1.

More specifically, in order to service IRQ1, CPU 525 executes interrupt software, normally coded to control an on-screen display (OSD) logic block 550, to produce the options menu 210 (see FIGS. 2A and 2B).

Upon receiving the second command from the remote control (e.g., user selecting the ADD icon), RCU-IF 435 transfers a second interrupt request signal (IRQ2), corresponding to the second command, directly to CPU 525 or indirectly through a queuing mechanism (not shown). In response to detecting IRQ2, CPU 525 executes interrupt software contained in external NV memory element 445 (or NV memory element 540) and services IRQ2. In one embodiment, the CPU 525 signals traffic controller 520, via communication line 555, to retrieve at least programming data contained in external volatile memory 515 and route the programming data to OSD logic block 550. Next, CPU 525 controls OSD logic block 550 to decompress the programming data in accordance with a recognized video format and to produce (for display) the electronic bookmark guide 350 (see FIG. 3B) in a manner well-known in the art. In general, the programming data is processed as a bitmap to overlay appropriate grids forming the layout of the electronic bookmark guide 350.

The electronic bookmark guide 350 may be superimposed over video by mixing the electronic bookmark guide 350 with video output from video decoder 560. The video output is video received by main logic block 410 and decompressed in accordance with Moving Picture Experts Group (MPEG), Joint Picture Experts Group (JPEG) or any other video decompression function. The resulting mixed video output is transferred to signal encoder 565. Signal encoder 565 converts the mixed video output into an analog signal having a recognized video format such as NTSC, PAL, SECAM and the like.

In one embodiment, to scroll through the channels, the viewer may be use the scroll buttons 382a-d on the ABXY button grid 380 of the remote control 115. For example, the central processing unit 525 (FIG. 5) may be configured to execute software (stored in either NV memory 445 or NV memory 540) so as to scroll through the index 380, e.g., from the bottom to the top, by depressing the up scroll button 182a or from the top to the bottom, by depressing the down scroll button 182b. Similarly, the central processing unit 525 may be configured to execute software so as to scroll through the index 380 from right to left, by depressing the left scroll button 182c or to scroll through the index 380 from left to right, by depressing the right scroll button 182d. Each time a scroll button 182a, b, c or d is depressed, the corresponding channel is displayed. As discussed earlier, the viewer may select to view a highlighted channel in guide 380 by depressing the + channel key 186a, in accordance with the instructions provided in the channel selection guide 362.

Figure 6:
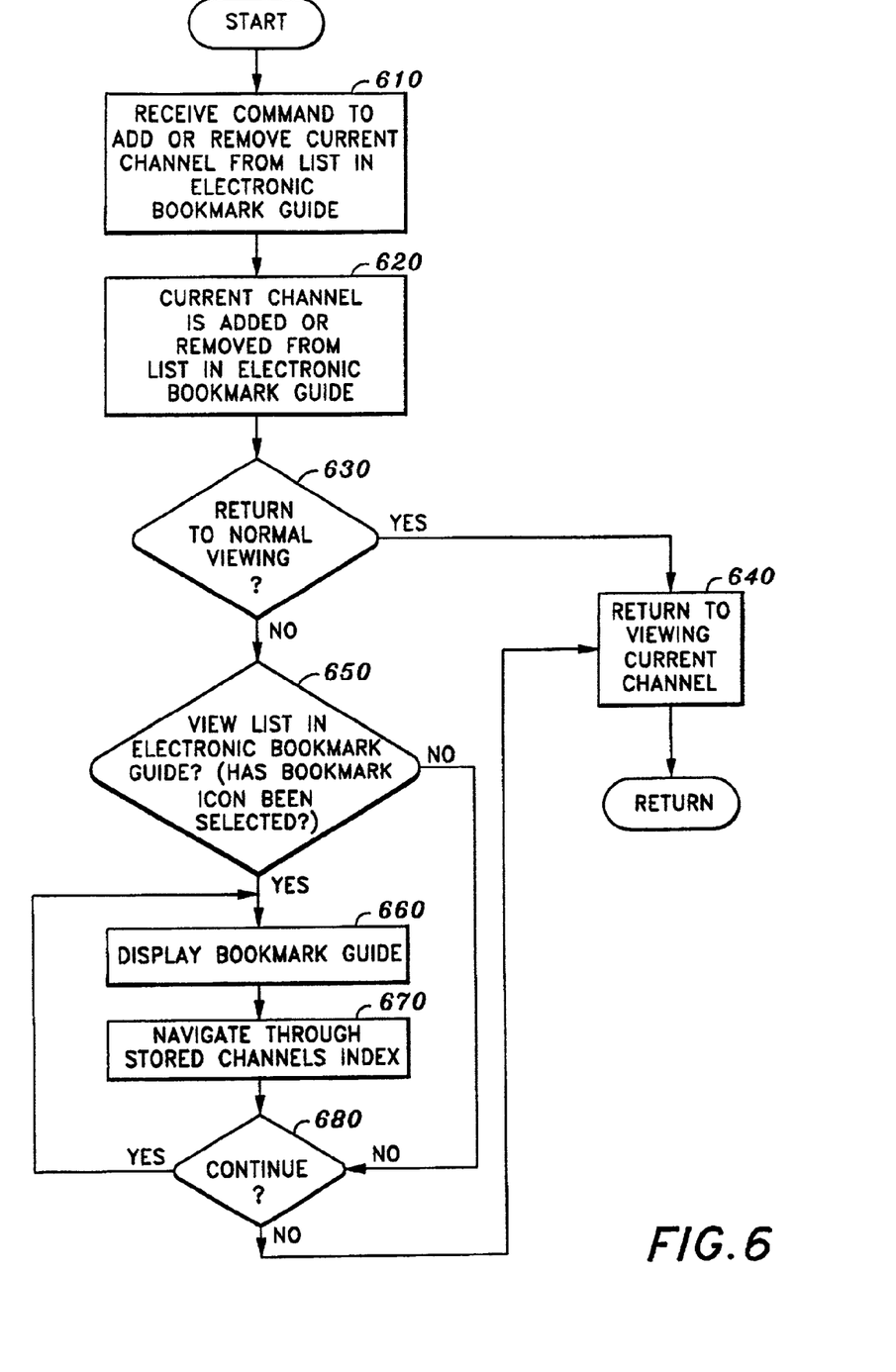
FIG. 6 is a flow chart illustrating one embodiment of the channel selection process provided in accordance with the principles of the invention.

FIG. 6 is a flow chart illustrating one embodiment of the channel selection and storage process provided in accordance with the principles of the invention. Proceeding from a START state, a command to add or remove the current channel from a favorite channel list in the electronic bookmark guide is received (process block 610). This may be accomplished with a single click of the ADD icon or the REMOVE icon, respectively. The process 600 responds to the command by adding or removing the current channel from the list in the electronic bookmark guide (process block 620).

Advancing from process block 620, the process 600 queries if the viewer would like to return to normal viewing. If so, the process 600 returns to provide viewing of the current channel. Otherwise, the process 600 queries if the viewer has selected to view the list in the electronic bookmark guide (decision block 650). This may be determined by detecting if the viewer has selected the bookmark icon. If so, the process 600 proceeds to process block 660, where it displays the electronic bookmark guide. The viewer can then navigate through the stored channels by scrolling through the stored channels index 380 (process block 670). The process 600 then advances to decision block 668. If, at decision block 650, the process 600 determines that the viewer does not wish to view the list in the bookmark guide, it will proceed to decision block 680.

At decision block 680, the process determines if it should continue monitoring selection of the bookmark icon. If so, it returns to process block 660. Otherwise, it proceeds to process block 640 where normal viewing resumes.

Figure 7:
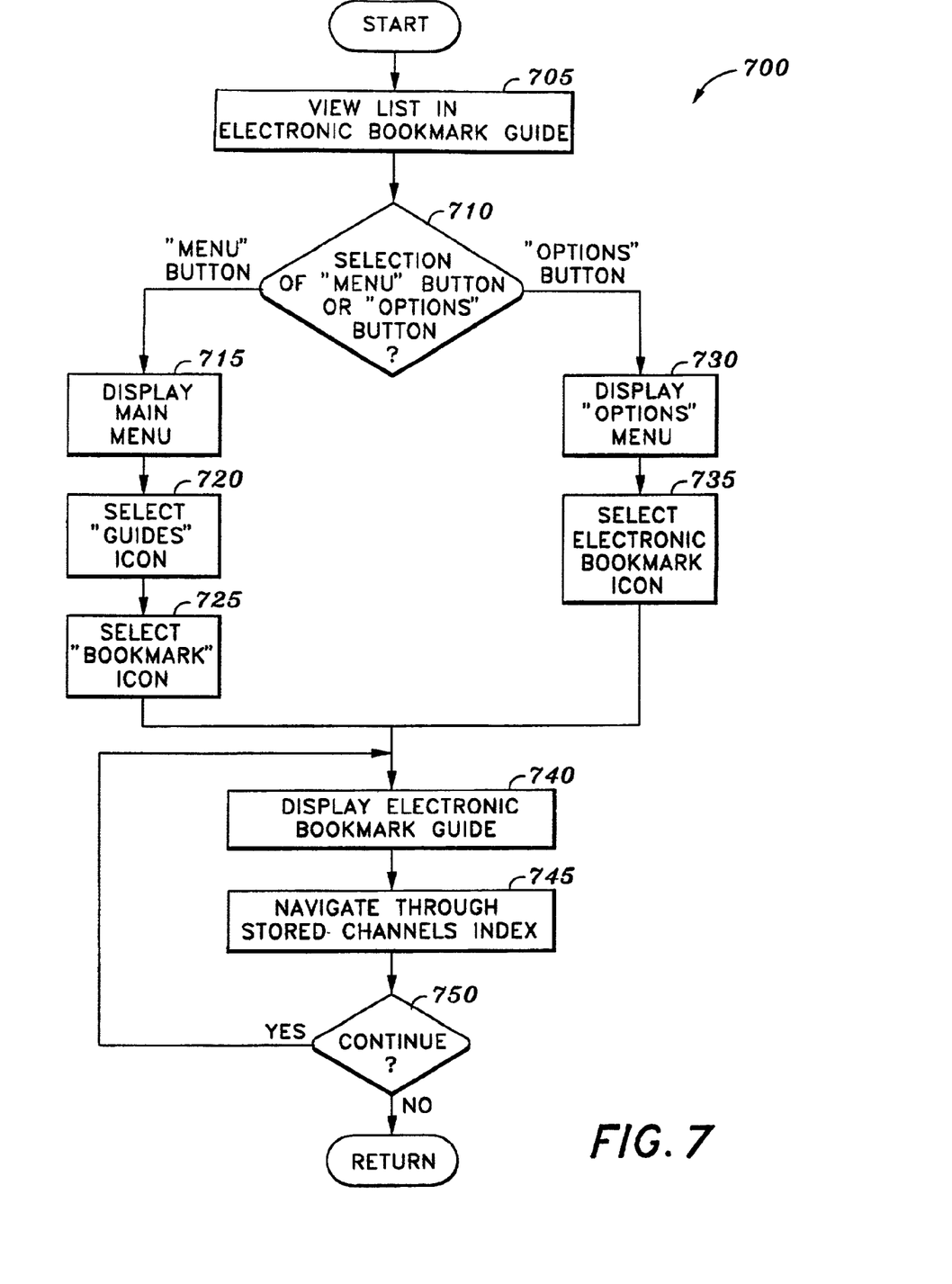
FIG. 7 is a flow chart illustrating one embodiment of the channel navigation process provided in accordance with the principles of the invention.

FIG. 7 is a flow chart illustrating one embodiment of the channel viewing process 700 provided in accordance with the principles of the invention. Beginning from a START state, the process 700 proceeds to process block where it receives a command to display the viewer may select to view the list of channels stored in the electronic bookmark guide by depressing either the "MENU" button or the "OPTIONS" button. The process 700 then proceeds to decision block 710, where it determines if the viewer has selected viewing of the electronic bookmark guide by depressing the "MENU" button or the "OPTIONS" button. If the "MENU" button was depressed, the process 700 proceeds to process block 715, where it displays the main menu. To select viewing of the list, the viewer may select the "GUDIES" icon listed in the main menu, as shown in process block 720. Upon selection of the "GUIDES" icon, the process displays a list of guides that are available for viewing by the user, one of which includes the BOOKMARK icon. The viewer may then select the BOOKMARK icon, as shown in process block 725, to view the list.

If, at decision block 710, the process 700 determines that the viewer had depressed the "OPTIONS" button, the process 700 proceeds to display the options menu (process block 730). The viewer may then select the electronic bookmark icon (process bock 735) to view the list. From either of process blocks 725 or 735, the process 700 proceeds to process block 740, where it displays the electronic bookmark guide. The viewer may then navigate through the stored channels by using the scroll buttons 182a-d as described earlier. To select a channel for viewing, the viewer may select the channel+key 186a on the remote control 115. The process 700 may be programmed to query if it should continue, as shown in decision block 750. If so, the process returns to process block 740. Otherwise, it terminates and returns to the main program.

It is contemplated that the invention may be implemented for use in display systems other than that provided using an IRD 110. Moreover, the invention may be implemented for selection of audio or video, (any other) channels. For example, the invention may be implemented in a television system, an in-flight entertainment system, a computer network system or any other electronic system. It may be used to quickly and conveniently store a list of channels for the viewer to subsequently view and/or select from.

Through the implementation of the present invention, one or more channels may be selected for storing by merely selecting an icon associated with adding of the channel to a list of stored channels. As a result, selection, removal and/or viewing of a preferred list of channels may be performed without substantial user interaction. In addition, the frequency of errors may also be reduced.

The present invention described herein may be designed in many different embodiments and using many different configurations. As discussed herein, the architecture of the IRD is flexible. While the present invention has been described in terms of various embodiments, other embodiments may come to mind to those skilled in the art without departing from the spirit and scope of the present invention. The invention should, therefore, be measured in terms of the claims which follow.

What is claimed is:

1. A method for selectively storing, at an entertainment system, data being received and displayed by the entertainment system where the data is associated with a broadcast channel, the method comprising:
   receiving programming data associated with the channel;
   displaying a show associated with the channel;
   displaying a menu associated with storing of the channel in memory including displaying an add icon that is selectable for adding the channel associated with the show currently being displayed when the current channel is not stored in said memory and displaying a remove icon in place of the add icon where the remove icon is selectable to remove the channel associated with the show currently being displayed from said memory when the current channel is stored in said memory and including a mark icon that is selectable for listing channels previously selected for adding to memory;
   receiving a selection, in response to detecting a selection of the add icon displayed in the menu when the current channel is not stored in said memory, to store the programming data of the channel associated with the show currently being displayed into memory of the entertainment system;
   storing the programming data associated with the channel currently being displayed into the memory; and
   displaying a second menu, in response to detecting a selection of the mark icon, where the second menu comprises: a graphical portion and a list of channels stored in said memory, wherein said list of channels is scrollable and said graphical portion displays a show corresponding to one of the channels in said list of channels during scrolling;
   wherein the second menu further comprising an instruction displayed in the graphical portion and superimposed over the show displayed in the graphical portion, where the instruction comprises a string of textual data explaining an action to be performed by a user to display the channel depicted in the graphical portion.

2. The method of claim 1, wherein the storing includes specifying that the channel is to be added to a list of stored channels.

3. The method of claim 2, further comprising
   removing, in response to detecting a selection of the remove icon displayed in the menu in place of the add icon when the current channel is stored in said memory of the entertainment system, the current channel from the list of stored channels.

4. The method of claim 1, further comprising selecting for display a list of stored channels and displaying the list of stored channels.

5. The method of claim 1, wherein receiving programming data comprises receiving a digital bit stream including the programming data and sensory data corresponding to the programming data.

6. The method of claim 1, wherein the receiving the selection to store the programming data comprises:
   executing software by a central processing unit, implemented within the entertainment system, to produce the menu; and
   receiving the selection of the add icon of the screen menu to prompt selection of the channel for storage in the memory.

7. The method of claim 6, wherein the storing the programming data into the memory includes storing the channel number information and source of the channel into the memory.

8. The method of claim 6, further comprising:
   displaying a list of the stored channels, in response to receiving a selection to display the list of the stored channels; and
   causing a broadcast receiver to tune to an identified channel in the list of the stored channels to display a show corresponding to the channel in response to receiving a selection of the identified channel from stored channels.

9. The method of claim 6, further comprising:
   receiving a selection of an option to exit the screen menu; and
   removing the screen menu from being displayed in response to receiving the selection to exit the screen menu.

10. The method of claim 1, wherein the displaying the second menu comprises displaying the second menu superimposed over the playback of the programming data associated with the channel currently being displayed and where the instruction comprises a string of textual data explaining a series of actions to be performed by a user to display the channel depicted in the graphical portion.

11. An entertainment system comprising:
   a display monitor; and
   a broadcast receiver coupled to the display monitor, the broadcast receiver including a front-end unit capable of receiving programming data associated with a show broadcast for viewing on the display monitor, a memory, and a central processing unit coupled to the memory, the central processing unit coupled to receive the programming data associated with a broadcast channel, the central processing unit to execute software to load the programming data associated with the channel currently being displayed into the memory, to cause a first screen menu to be displayed on said display monitor, the first screen menu including a first icon selectable to add the current channel to a list of channels stored in said memory when the current channel is not included in the list of channels and including a second icon in place of the first icon where the second icon is selectable to remove the current channel from the list of channels stored in said memory when the current channel is currently stored in the list of channels; and
   wherein the central processing unit to execute software to display a second screen menu where the second screen menu comprises: a graphical portion and the list of channels stored in said memory; wherein said list of channels displayed in the second screen menu is scrollable and said graphical portion displays a show corresponding to one of the channels in said list of channels during scrolling; and wherein the second screen menu further comprising an instruction displayed in the graphical portion and superimposed over the show displayed in the graphical portion, where the instruction comprises a string of textual data explaining an action to be performed by a user to display the channel depicted in the graphical portion.

12. The entertainment system of claim 11, wherein the display monitor includes a television receiver.

13. The entertainment system of claim 11, wherein the broadcast receiver includes an integrated receiver decoder and the integrated receiver decoder comprises:
   an amplification circuitry;
   a demodulator;
   a main logic block;
   a transceiver device;
   a remote command unit interface;
   an extension bus that couple with and provides a communication path between at least the main logic block and each of the transceiver device and the remote command unit interface; and
   a memory;
   wherein the remote command unit interface receive at least a first command from a remote control device and transfers a first interrupt request signal, corresponding to the first command, to the central processing unit such that the central processing unit, in response to receiving the first interrupt, executes interrupt software contained in one of the memory and the second memory to implement storing, into the memory, the programming data associated with the channel currently being displayed to add the current channel to the list of channels stored in said memory.

14. The entertainment system of claim 11, wherein the central processing unit executes software to add the currently displayed channel to the list of channels stored in said memory when the central processing unit detects a selection of the first icon.

15. The entertainment system of claim 14, wherein the first screen menu further comprises a third icon selectable to display, by the central processing unit upon detecting a selection of the third icon, the second screen menu.

16. The entertainment system of claim 11, wherein the second screen menu further comprises a text portion, said text portion including a description of said show corresponding to said one of the channels in said list of channels during scrolling.

17. The entertainment system of claim 16, wherein the second screen menu, when displayed, is superimposed over the playback of the programming data associated with the channel currently being displayed.

18. The entertainment system of claim 17, wherein the instruction comprises the string of textual data explaining a series of actions to be performed by a user to display the channel depicted in the graphical portion.

* * * * *